United States Patent Office 3,452,058
Patented June 24, 1969

3,452,058
6-SUBSTITUTED-6-DEHYDRO ANDROSTANES AND PREGNANES
Howard J. Ringold and Albert Bowers, Mexico City, Mexico, assignors, by mesne assignments, to Syntex Corporation, a corporation of Panama
No Drawing. Filed July 10, 1959, Ser. No. 826,119
Claims priority, application Mexico, Nov. 13, 1958, 52,733
Int. Cl. C07c 169/14, 169/26, 169/36
U.S. Cl. 260—397.4                                    28 Claims The present invention relates to cyclopentanophenanthrene derivatives and to a process for making same.

More particularly, the present invention relates to novel 6-substituted-$\Delta^{4,6}$-3-ketones of the androstane and pregnane series, that may be expressed by the following formula:

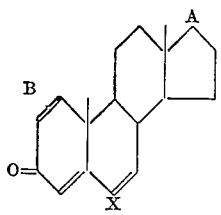

wherein X is selected from the group consisting of methyl and halogen (fluorine, chlorine, bromine), A is selected from the group consisting of [$\alpha$-H, $\beta$-OH], [$\alpha$-H, $\beta$-Oacyl], [$\alpha$-alkyl(alkenyl, alkynyl), $\beta$-OH], [$\alpha$-alkyl(alkenyl, alkynyl), $\beta$-Oacyl], [$\alpha$-H, $\beta$-COCH$_3$], [$\alpha$-Oacyl, $\beta$-COCH$_3$], [$\alpha$-Oacyl, $\beta$-COCH$_2$Oacyl] and B is selected from the group consisting of a simple and a double bond between C–1 and C–2.

The new compounds as above set forth are valuable progestational drugs. This progestational activity is particularly marked in the 17-esters, such as for example the 17-esters of 6-chloro-$\Delta^{4,6}$-pregnadien-17$\alpha$-ol-3,20-dione, having acyl groups of hydrocarbon carboxylic acids of up to 12 carbon atoms, saturated or unsaturated, of straight or branched chain, cyclic or cyclic-aliphatic, which may be substituted by functional groups such as hydroxyl, acyloxy (of up to 12 carbon atoms), alkoxy (of up to 5 carbon atoms) or halogen (F, Cl, Br); typical esters are for example the acetate, propionate, t-butyrate, hemisuccinate, enanthate, caproate, benzoate, trimethylacetate, phenoxyacetate, phenylpropionate and cyclopentylpropionate or $\beta$-chloroproprionate; typical alkyl (alkenyl or alkynyl) groups are the methyl, ethyl, propyl, vinyl, 1-propenyl, 2-butenyl, ethinyl and 1-propinyl group.

The following equation illustrates a process for preparing the novel compounds of the present invention:

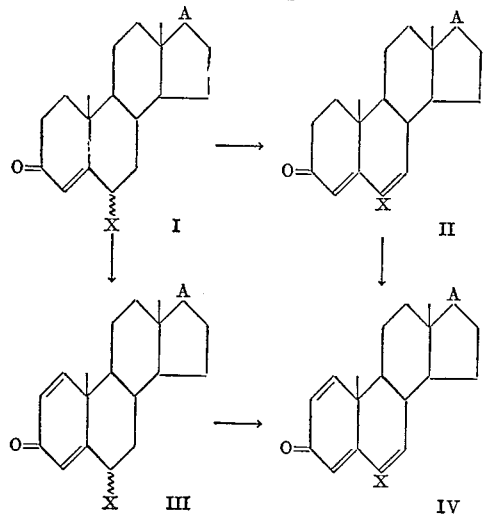

In the above equation, A and X represent the same groups as heretofore set forth.

In practicing the process above set forth, a double bond was introduced at C–6 of the corresponding 6-substituted-$\Delta^4$-3-ketone by reaction with chloranil, for which purpose the starting material was heated with chloranil in ethyl acetate solution and in the presence of glacial acetic acid. Starting with a 6-substituted-$\Delta^{1,4}$-3-ketone, a 6-substituted-$\Delta^{1,4,6}$-3-ketone was thus obtained, which could also be obtained by dehydrogenation of the 6-substituted-$\Delta^{4,6}$-3-ketone, using selenium dioxide as dehydrogenating agent.

The reaction conditions of the process hereabove referred to, may be varied in an ample sense. Some of the possible modifications are the following: for the introduction of a double bond at C–6 there may be used, in place of ethyl acetate as solvent, other esters of a lower aliphatic acid, preferably acetic acid, with a lower aliphatic alcohol other than ethanol, such as amyl acetate; alternatively, there may be used xylene or, in the case of a 6-halo-$\Delta^{1,4}$-compound, n-amyl alcohol. The reaction of a $\Delta^4$-3-ketone with chloranil using n-amyl alcohol as solvent, serves to introduce simultaneously two double bonds at C–1, 2 and C–6, 7. The dehydrogenation of a $\Delta^{4,6}$-3-ketone (Formula II) to the corresponding $\Delta^{1,4,6}$-3-ketone (Formula IV) can be carried out by reactions with selenium dioxide or by incubation with certain microorganisms, for example *Corynebacterium simplex* ATCC 6946 or *Septomyxa affinis* ATCC 5737. The selenium dioxide dehydrogenation may be carried out by refluxing the steroid with this reagent in mixture with t-butanol in the presence of catalytic amounts of pyridine for 48 hours under the atmosphere of nitrogen; likewise the reaction may be modified, using for example instead of t-butanol another lower tertiary alcohol and/or substituting pyridine by another catalyst, such as collidine and/or shortening or prolonging the reaction time for a period between 12 to 96 hours.

In the case of starting materials having a hydroxyl group at C–17, or two hydroxyl groups at C–17 and C–21, these were preferably esterified by an acid rest, such as for example acetate. The acyloxy groups of the final 6-dehydro compounds may be saponified by conventional methods: the 17-esters were saponified by reaction with potassium hydroxide in methanolic solution at reflux temperature, whereas for the 17,21-diesters this reaction is preferentially carried out at room temperature. Finally the free hydroxyl groups may be reesterified, if so desired, with other acid radicals.

The starting materials for the process of the present invention were disclosed and claimed in the following United States applications: Ser. Nos. 649,763; 679,762; 709,795 all now abandoned; 744,347 now Pat. No. 3,067,219; 770,916 now Pat. No. 3,322,769; 776,694 and 776,689 both now abandoned; 792,990 now Pat No. 3,019,239; 794,424 now Pat No. 3,080,391; 804,152 now abandoned; and 806,762 now Pat. No. 3,176,032.

The following specific examples serve to illustrate but are not intended to limit the present invention:

EXAMPLE I

A mixture of 5 g. of 6$\alpha$-chloro-17$\alpha$-acetoxy progesterone, 10 g. chloranil, 125 cc. of ethyl acetate and 25 cc. of acetic acid was refluxed for 55 hours under an atmosphere of nitrogen. The solution was cooled, washed with aqueous 10% sodium hydroxide solution till the washings were colorless, then with water till neutral, dried over anhydrous sodium sulfate and evaporated at reduced pressure. Chromatographic purification on neutral alumina gave 6-chloro-$\Delta^{4,6}$-pregnadiene-17$\alpha$-ol - 3,20-dione acetate, which after one crystallization from acetone-ether melted at 210–211°; [$\alpha$]$_D$ +8° (chloroform), $\lambda_{max.}^{EtOH}$ 284–286 m$\mu$, log $\epsilon$ 4.30

A solution of 1 g. of the above acetate in 100 cc. of methanol was refluxed for 1 hour with 0.5 g. of potassium hydroxide, neutralized by addition of acetic acid, concentrated to a small volume and poured into 500 cc. of water. The precipitate was filtered and crystallized from acetone-ether to yield 6-chloro-$\Delta^{4,6}$-pregnadien-17$\alpha$-ol-3,20-dione.

Conventional acetylation with acetic anhydride in the presence of p-tuluenesulfonic acid yielded 6-chloro-$\Delta^{4,6}$-pregnadien-17$\alpha$-ol-3,20-dione acetate.

EXAMPLE II

A mixture of 5 g. of 6$\alpha$,17$\alpha$-dimethyl-testosterone acetate, 10 g. of chloranil, 125 cc. of ethyl acetate and 25 cc. of acetic acid was refluxed for 96 hours under an atmosphere of nitrogen, cooled, washed with 10% aqueous sodium hydroxide till the washings were colorless, then with water till neutral, dried over anhydrous sodium sulfate and evaporated. Chromatographic purification over neutral alumina produced 6,17$\alpha$-dimethyl-6-dehydro-testosterone acetate. Conventional saponification with potassium hydroxide (1 hour reflux) yielded 6,17$\alpha$-dimethyl-6-dehydro-testosterone.

EXAMPLE III

By the method of the preceding example, 5 g. of 6$\beta$-chloro progesterone and 6$\beta$-bromo progesterone were converted into 6-chloro-6-dehydro progesterone and 6-bromo-6-dehydro progesterone.

EXAMPLE IV

By the method of Example I, 5 g. of 6$\alpha$-methyl-17$\alpha$-acetoxy progesterone were converted into 6-methyl-17$\alpha$-acetoxy-6-dehydro-progesterone.

Dehydrogenation by the method of Example X yielded 6-methyl-17-acetoxy-1,6-bis-dehydro-progesterone.

EXAMPLE V

By the method of Example I, but extending the reaction period for 1 week, 5 g. of 6$\alpha$-fluoro-17$\alpha$-propyl-1-dehydro-testosterone cyclopentylpropionate was converted into 6-fluoro-17$\alpha$-propyl-1,6-bis-dehydro-testosterone cyclopentylpropionate.

EXAMPLE VI

A mixture of 5 g. of 6$\beta$-fluoro-17$\alpha$-propyl testosterone acetate, 10 g. chloranil, 125 cc. of n-amyl acetate and 25 cc. of acetic acid was refluxed for 8 hours under nitrogen atmosphere; the product was worked up as described in Example I to give the acetate of 6-fluoro-17$\alpha$-propyl-6-dehydro-testosterone.

EXAMPLE VII

By the method of the preceding example, 5 g. of 6$\alpha$-chloro-17$\alpha$-ethinyl-1-dehydro-testosterone acetate was converted into 6-chloro-17$\alpha$-ethinyl-1,6-bis-dehydro-testerone acetate.

EXAMPLE VIII

By the method of Example VI, 5 g. of 6$\alpha$-fluoro-17$\alpha$-acetoxy-1-dehydro-progesterone and of 6$\alpha$-bromo-17$\alpha$-acetoxy-1-dehydro-progesterone were converted into 6-fluoro-17$\alpha$-acetoxy-1,6-bis-dehydro-progesterone and 6-bromo-17$\alpha$-acetoxy-1,6-bis-dehydro-progesterone.

EXAMPLE IX

By the method of Example VI, 5 g. of 6$\alpha$-methyl-$\Delta^{1,4}$-pregnadien-17$\alpha$,21-diol-3,20-dione diacetate were converted into 6-methyl-$\Delta^{1,4,6}$-pregnatrien-17$\alpha$,21-diol-3,20-dione diacetate.

EXAMPLE X

A mixture of 3 g. of 6,17$\alpha$-dimethyl-6-dehydro-testosterone acetate (Example II) and 150 cc. of methanolic 1% potassium hydroxide solution was stirred for 1 hour at a temperature of around 60° C. under an atmosphere of nitrogen; it was acidified by addition of acetic acid, concentrated to a small volume under reduced pressure, and poured into ice water. The precipitate was filtered, washed with water, dried and recrystallized from acetone-hexane to give the free 6,17$\alpha$-dimethyl-6-dehydro testosterone.

A mixture of the above product, 2.0 g., 100 cc. of t-butanol, 600 mg. of selenium dioxide and 0.2 cc. of pyridine, was refluxed for 48 hours under an atmosphere of nitrogen. It was filtered, while hot, with the help of Celite, and the filtrate was evaporated to dryness. The residue was decolorized by refluxing its acetonic solution with decolorizing charcoal for 1 hour, the acetone was evaporated and the product was purified by chromatography on neutral alumina. Thus there was obtained 6,17$a$-dimethyl-1,6-bis-dehydro-testosterone.

EXAMPLE XI

By the method of the preceding example, 3 g. of 6-fluoro-17$\alpha$-propyl-6-dehydro-testosterone acetate (Example V) were converted into the free alcohol and this was dehydrogenated with selenium dioxide to yield 6-fluoro-17$\alpha$-propyl-1,6-bis-dehydro-testosterone.

A mixture of 1 g. of the above material, 30 cc. of acetic acid, 6 cc. of acetic anhydride and 900 mg. of p-toluenesulfonic acid monohydrate was kept overnight at room temperature under an atmosphere of nitrogen. The mixture was poured into ice water, the precipitate was filtered, washed with water, dried and recrystallized from acetone-hexane to give 6-fluoro-17$\alpha$-propyl-1,6-bis-dehydro-testesterone.

In another experiment 6-fluoro-17$\alpha$-propyl-6-dehydro-testesterone acetate was dehydrogenated directly to 6-fluoro-17$\alpha$-propyl-1,6-bis-dehydro-testosterone acetate.

EXAMPLE XII

By the method of Example X, 6-methyl-17$\alpha$-acetoxy-6-dehydro-progesterone (Example IV) was dehydrogenated to 6-methyl-17$\alpha$-acetoxy-1,6-bis-dehydro progesterone.

We claim:
1. A new compound of the formula:

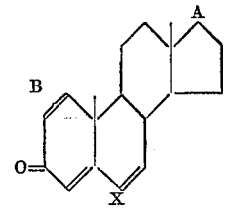

wherein X is selected from the group consisting of fluorine, chlorine and bromine; A is selected from the group consisting of [$\alpha$-H, $\beta$-OH], [$\alpha$-H, $\beta$-Oacyl], [$\alpha$-alkyl(alkenyl, alkynyl), $\beta$-OH], [$\alpha$-alkyl(alkenyl, alkynyl), $\beta$-Oacyl], [$\alpha$-H, $\beta$-COCH$_3$], and

[$\alpha$-Oacyl, $\beta$-COCH$_2$Oacyl]

B is selected from the group consisting of a single and a double bond; the acyl groups are derived from hydrocarbon carboxylic acids of up to 12 carbon atoms.

2. 6-methyl-$\Delta^{1,4,6}$-pregnatrien-17$\alpha$-ol-3,20-dione.

3. 6-methyl-$\Delta^{1,4,6}$-pregnatrien-17$\alpha$,21-diol-3,20-dione diacetate.

4. 6-halo-$\Delta^{4,6}$-androstadien-17$\beta$-ol-3-one, derived from a halogen having an atomic weight below 100.

5. The hydrocarbon carboxylic acid esters of up to 12 carbon atoms of 6-halo-$\Delta^{4,6}$-androstadien-17$\beta$-ol-3-one, derived from a halogen having an atomic weight below 100.

6. A compound selected from the group consisting of 6-halo-17$\alpha$-alkyl-$\Delta^{4,6}$-androstadien-17$\beta$-ol-3-one, 6-halo-17$\alpha$-alkenyl-$\Delta^{4,6}$-androstadien-17$\beta$-ol-3-one and 6-halo- 17α-alkinyl-Δ⁴-androstadien-17β-ol-3-one, wherein the halo is a halogen having an atomic weight below 100.

7. The hydrocarbon carboxylic acid esters of up to 12 carbon atoms of 6-halo-17α-alkyl-Δ⁴,⁶-androstadien-17β-ol-3-one wherein the halo is a halogen having an atomic weight below 100.

8. 6-fluoro-17β-propyl-Δ⁴,⁶-androstadien-17α-ol-3-one.

9. A compound selected from the group consisting of 6-halo-17α-alkyl-Δ¹,⁴,⁶-androstatrien-17β - ol - 3 - one, 6-halo-17α-alkenyl-Δ¹,⁴,⁶ - androstatrien-17β-ol-3-one and 6-halo-17α-alkinyl-Δ¹,⁴,⁶-androstatrien-17β-ol-3-one wherein the halo is a halogen having an atomic weight below 100.

10. 6 - chloro-17β-ethinyl-Δ¹,⁴,⁶-androstatrien-17α-ol-3-one acetate.

11. 6-methyl-Δ⁴,⁶-androstadien-17β-ol-3-one.

12. 6-methyl-17α-alkyl-Δ⁴,⁶-androstadien-17β-ol-3-one.

13. 6,17α-dimethyl-Δ⁴,⁶-androstadien-17β-3-one.

14. 6,17α-dimethyl-Δ¹,⁴,⁶-androstatrien-17β-3-one.

15. 6 - methyl - 17α-alkyl-Δ¹,⁴,⁶-androstatrien-17β-ol-3-one.

16. The hydrocarbon carboxylic acid esters of up to 12 carbon atoms of 6-halo-17α-alkenyl-Δ⁴,⁶-androstadien-17β-ol-3-one wherein the halo is a halogen having an atomic weight below 100.

17. The hydrocarbon carboxylic acid esters of up to 12 carbon atoms of 6-halo-17α-alkinyl-Δ⁴,⁶-androstadien-17β-ol-3-one wherein the halo is a halogen having an atomic weight below 100.

18. 6 - methyl - 17α-alkenyl-Δ⁴,⁶-androstadien-17β-ol-3-one.

19. 6 - methyl - 17α-alkinyl-Δ⁴,⁶-androstadien-17β-ol-3-one.

20. 6-methyl-17α-alkenyl-Δ¹,⁴,⁶ - androstatrien - 17β-ol-3-one.

21. 6-methyl-17α-alkinyl-Δ¹,⁴,⁶-androstatrien - 17β-ol-3-one.

22. The hydrocarbon carboxylic acid esters of up to 12 carbon atoms of 6-methyl-17α-alkyl-Δ⁴,⁶-androstadien-17β-ol-3-one.

23. The hydrocarbon carboxylic acid esters of up to 12 carbon atoms of 6-methyl-17α-alkenyl-Δ⁴,⁶-androstadien-17β-ol-3-one.

24. The hydrocarbon carboxylic acid esters of up to 12 carbon atoms of 6-methyl-17α-alkinyl-Δ⁴,⁶-androstadien-17β-ol-3-one.

25. The hydrocarbon carboxylic acid esters of up to 12 carbon atoms of 6-methyl-17α-alkyl-Δ¹,⁴,⁶-androstatrien-17β-ol-3-one.

26. The hydrocarbon carboxylic acid esters of up to 12 carbon atoms of 6-methyl-17α-alkinyl-Δ¹,⁴,⁶-androstatrien-17β-ol-3-one.

27. The hydrocarbon carboxylic acid esters of up to 12 carbon atoms of 6-methyl-17α-alkinyl-Δ¹,⁴,⁶-androstatrien-17β-ol-3-one.

28. The hydrocarbon carboxylic acid esters of up to 12 carbon atoms of 6-methyl-Δ⁴,⁶-pregnatrien-17α,21-diol-3,20-dione.

References Cited
UNITED STATES PATENTS

| | | | |
|---|---|---|---|
| 2,882,282 | 4/1959 | Agnello et al. | 260—397.3 |
| 2,883,379 | 4/1959 | Moreland et al. | 260—239.55 |
| 2,895,969 | 7/1959 | Ringold et al. | 260—397.3 |

ELBERT L. ROBERTS, *Primary Examiner.*

U.S. Cl. X.R.

260—397.3, 397.47, 999

PO-1050
(5/69)

UNITED STATES PATENT OFFICE
CERTIFICATE OF CORRECTION

Patent No. 3,452,058            Dated June 24, 1969

Inventor(s) Howard J. Ringold and Albert Bowers

It is certified that error appears in the above-identified patent and that said Letters Patent are hereby corrected as shown below:

Column 2, line 52, "649,763" should be -- 679,763 --; line 54, "3,067,219" should be -- 3,203,965; 753,629; 757,930, now Patent No. 3,067,219 --; line 56, "794,424" should be -- 794,242 --. Column 3, line 9, "p-tuluenesulfonic" should be -- p-toluenesulfonic --. Column 4, line 31, "testosterone" should be -- testosterone acetate --; line 58, cancel "$[\alpha H, \beta-COCH_3]$". Column 5, line 1, "$\Delta^{4,}$-" should be -- $\Delta^{4,6-}$ --; Claim 8, "17$\beta$-propyl" should be -- 17$\alpha$-propyl -- and "17$\alpha$-ol" should be -- 17$\beta$-ol --; Claim 10, first line, "17$\beta$-ethinyl" should be -- 17$\alpha$-ethinyl - and "17$\alpha$-ol" should be -- 17$\beta$-ol --; Claim 13, "17$\beta$-3-one" should be -- 17$\beta$-ol-3-one --; Claim 14, "17$\beta$-3-one" should be -- 17$\beta$-ol-3-one --. Column 6, line 15, "16." should be -- 26. --.

SIGNED AND
SEALED
MAY 5 1970

(SEAL)
Attest:

Edward M. Fletcher, Jr.
Attesting Officer

WILLIAM E. SCHUYLER, JR.
Commissioner of Patents